United States Patent [19]

Tsujibayashi

[11] Patent Number: 4,562,800

[45] Date of Patent: Jan. 7, 1986

[54] ENGINE INTAKE PIPE ARRANGEMENT FOR AUTOMOTIVE VEHICLE

[75] Inventor: Yoshiyuki Tsujibayashi, Tokyo, Japan

[73] Assignee: Nissan Motor Co., Ltd., Japan

[21] Appl. No.: 623,557

[22] Filed: Jun. 22, 1984

[30] Foreign Application Priority Data

Jul. 11, 1983 [JP] Japan ............. 58-107527[U]

[51] Int. Cl.⁴ ............................. F02B 77/00
[52] U.S. Cl. ................. 123/195 A; 123/198 E; 123/195 C; 181/229
[58] Field of Search ........... 123/198 E, 195 C, 195 A, 123/195 S; 181/204, 229

[56] References Cited

U.S. PATENT DOCUMENTS

| | | | |
|---|---|---|---|
| 3,810,526 | 5/1974 | Kawasaki | 123/198 E |
| 3,966,014 | 6/1976 | Gowing | 123/198 E |
| 4,235,298 | 11/1980 | Sackett et al. | 123/198 E |
| 4,300,511 | 11/1981 | Lang | 123/198 E |
| 4,338,890 | 7/1982 | Shelby et al. | 123/198 E |
| 4,440,555 | 4/1984 | Chichester | 123/198 E |

FOREIGN PATENT DOCUMENTS

| | | |
|---|---|---|
| 1775574 | 1/1974 | Fed. Rep. of Germany . |
| 2948570 | 7/1980 | Fed. Rep. of Germany . |
| 1343717 | 10/1963 | France . |
| 77548 | 6/1981 | Japan ............. 123/198 E |

Primary Examiner—Ira S. Lazarus
Attorney, Agent, or Firm—Leydig, Voit & Mayer, Ltd.

[57] ABSTRACT

An intake pipe is mounted in a floating manner on an intake manifold by mounting and holding member. The mounting and holding member comprise a resilient mounting ring or coil spring spanning a lower concave side of the intake pipe for thereby supporting the intake pipe in a floating manner and a resilient fastening band or a coil springs fastening the intake pipe to the intake manifold.

11 Claims, 4 Drawing Figures

ENGINE INTAKE PIPE ARRANGEMENT FOR AUTOMOTIVE VEHICLE

BACKGROUND OF THE INVENTION

1. Field of the Invention

The present invention relates in general to intake systems of automotive internal combustion engines and more particularly to engine intake pipe arrangements for automotive vehicles.

2. Description of the Prior Art

As is well known, an intake system of an automotive internal combustion engine is provided with a rigid, though slightly flexible, intake pipe which is arranged between an air cleaner and an intake manifold for fluidly interconnecting same. In the prior art intake pipe arrangement, such an intake pipe is rigidly mounted on a vehicle body or an engine by means of a bracket or brackets. Due to this, a pair of flexible rubber ducts are necessitated for connecting the opposed ends of the intake pipe to the air cleaner and the intake manifold in a manner to allow them to be movable to some extent relative to each other.

Thus the prior art engine intake pipe arrangement has a disadvantage that it leads to a large number of constituent parts of the intake system and therefore to a high manufacturing and assembling expense.

A further disadvantage is that thermal stress deformation and cracking of the bracket or brackets leading to breakage thereof may possibly occur due to the difference in temperature and thermal expansion coefficient between the intake pipe and the vehicle body or the engine.

SUMMARY OF THE PRESENT INVENTION

In accordance with the present invention, there is provided an improved engine intake pipe arrangement which comprises means for mounting and holding an intake pipe in a novel manner on a support. The mounting and holding means have a resilient mounting member interposed between the intake pipe and the support for supporting the intake pipe in a floating manner on the support, and a resilient fastening member fastening the intake pipe to the support.

In one embodiment, the intake pipe is at least in part formed to have a rectangle-like cross section having three straight sides and one concave side. The mounting member is a resilient ring mounted in a stretched state on the intake pipe to have a bridge portion spanning the concave side of the intake pipe. The support is an intake manifold, and the intake pipe is placed on the intake manifold in such a manner that the bridge portion of the mounting ring is made in contact with the upper part of the intake manifold so that the intake manifold is mounted in a floating manner by the resilience of the mounting ring. The fastening member is a resilient fastening band which is arranged adjacent the mounting ring in a manner to partly encircle the intake pipe and hooked at the opposed end thereof and in a stretched state to corresponding hooks in the form of projections provided to the intake manifold.

The above structure is quite effective for overcoming the disadvantages and shortcomings encountered in the prior arrangement.

It is accordingly an object of the present invention to provide a novel and improved engine intake pipe arrangement for an automotive vehicle which is free from the disadvantages and shortcomings noted above.

BRIEF DESCRIPTION OF THE DRAWINGS

The features and advantages of the engine intake pipe arrangement according to the present invention will become more clearly appreciated from the following description taken in conjunction with the accompanying drawings, in which.

DESCRIPTION OF THE PREFERRED EMBODIMENTS

Figure 1:
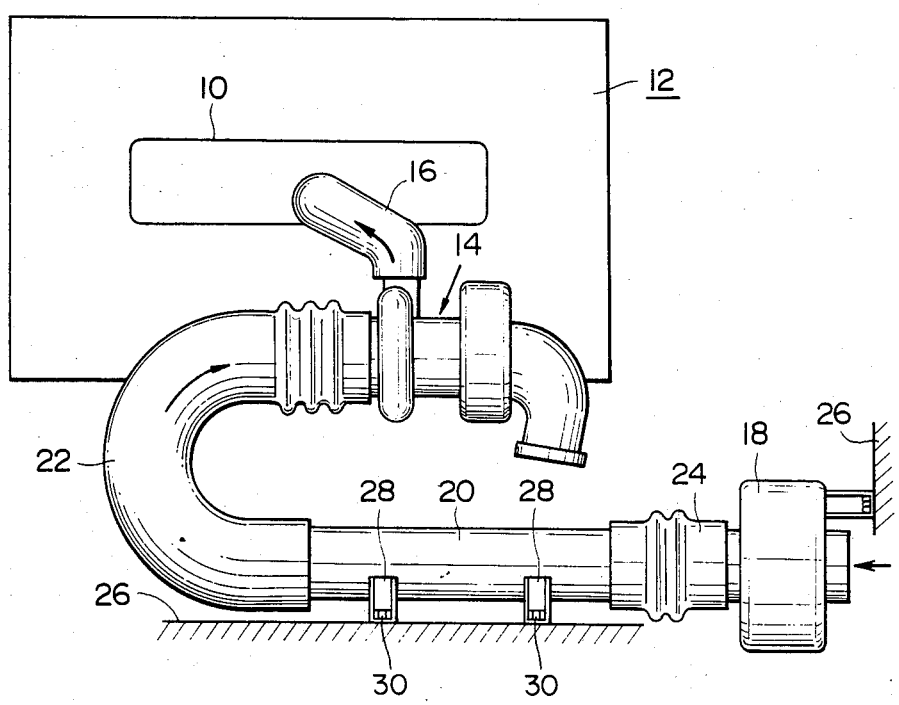
FIG. 1 is a schematic side elevation of an internal combustion engine and its intake system constructed and arranged according to the prior art.

Referring to FIG. 1, description is first made to a prior art intake system of an automotive internal combustion engine for a better understanding of the inventive step of the present invention.

In FIG. 1, there is shown a prior art intake system which includes an intake manifold 10 bolted to the side of an engine or an engine proper 12, a turbocharger 14 connected through an induction pipe 16 to the intake manifold 10, and an air cleaner 18 rigidly mounted on a vehicle body 26 and an intake pipe 20 arranged between the air cleaner 18 and the turbocharger 14 and connected to same by way of rubber ducts 22 and 24.

The intake pipe 20 is relatively long and thus needs to be supported on the vehicle body 26 or the like support. To this end, it has been practiced to utilize such brackets 28 and bolts 30 as illustrated in the drawing. The brackets 28 are spot-welded to the intake pipe 20 or otherwise formed integral with same and fastened to the vehicle body 26 as illustrated or to the engine proper 12, through not so shown, by means of the bolts 30. The intake pipe 20 is formed from a sheet steel on a synthetic resinous material or the like and thus rigid but has some flexibility.

In the aforementioned prior art intake system, since the intake pipe 20 is rigidly mounted on such a support as the vehicle body 26, the rubber ducts 22 and 24 are indispensable not only for compensating the production tolerances which are inevitable in the manufacture and assembly of the component parts of the intake system but also for allowing the turbocharger 14 and the air cleaner 18 to be movable to some extent relative to the intake pipe 20.

Due to the necessity of the rubber ducts 22 and 24, an increased number of constituent parts of the intake system and therefore an increased manufacturing and assembling expense result.

A further disadvantage of the prior art intake pipe arrangement is that such brackets 28 have a possibility of being subject to thermal stress cracking, particularly when the brackets 28 are bolted to the engine proper 12, though not so shown in the drawing, due to a difference in temperature and thermal expansion coefficient between the brackets 28 and the engine proper 12.

Such disadvantages and shortcomings of the prior art arrangement can be overcome by the present invention which will be described hereinafter with reference to FIGS. 2 to 4 in which like or corresponding parts to those of the prior art arrangement of FIG. 1 are designated by the same reference numerals as their corresponding parts and will not be described again for brevity.

Figure 2:
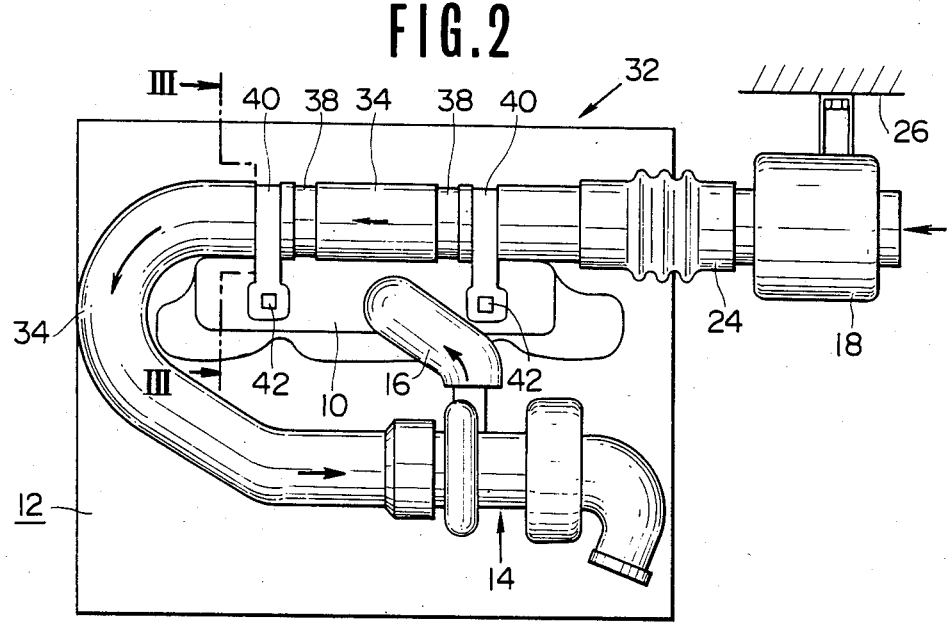
FIG. 2 is a view similar to FIG. 1 but showing an engine intake pipe arrangement according to the present invention.
Figure 3:
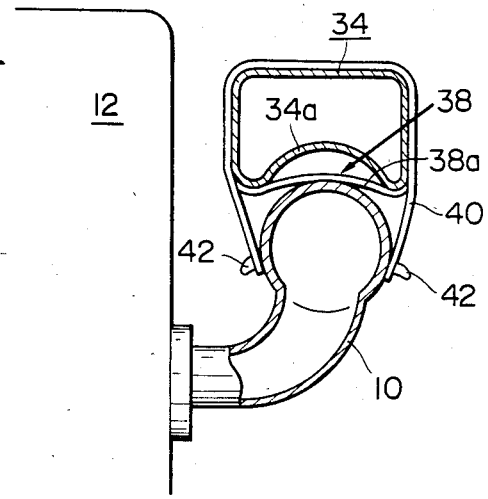
FIG. 3 is a fragmentary sectional view taken along the line III—III of FIG. 2.

FIGS. 2 and 3 show an engine intake pipe arrangement according to an embodiment of the present invention. The intake pipe arrangement is generally designated by 32 and comprises an intake pipe 34 which is formed considerably longer than before so that it is connected at its downstream end directly to the turbocharger 14 without employing such a rubber duct 22 as in the prior art arrangement of FIG. 1. The upstream end of the intake pipe 34 is connected through the rubber duct 24 to the air cleaner 18 as conventional.

The intake pipe 34 is at least in part formed to have a rectangle-like cross section having three straight sides (no numeral) and one concave or inwardly curved side 34a and is supported or mounted on the intake manifold 10 by resilient mounting and holding means 36. The intake pipe 34 is press-formed from a sheet steel or moulded from a synthetic resinous material or the like. The intake pipe 34 is thus rigid but has some flexibility.

The mounting and holding means 36 consist of two resilient mounting rings 38, two resilient fastening bands 40 and two pairs of hooks 42 in the form of projections provided to the intake manifold 10.

The mounting rings 38 are mounted on the intake pipe 34 and spaced from each other a predetermined distance with respect to the axial direction of the intake pipe 34. The mounting rings 38 are put into a predetermined stretched or tensioned state when mounted on the intake pipe 34 and have bridge portions 38a spanning the lower concave side 34a of the intake pipe 34.

The intake pipe 34 is placed on the intake manifold 10 in such a manner that the bridge portions 38a of the mounting rings 38 are made in contact with the upper part of the intake manifold 10 and fastened thereto by the fastening bands 40. The fastening bands 40 are arranged adjacent the respective mounting rings 38 in a manner to partly encircle the intake pipe 34, i.e., in a manner to extend along the three straight sides (upper and left-and-right sides) of the intake pipe 34 and hooked at the opposed ends thereof and in a predetermined tensioned state to the corresponding hooks 42 so that the intake pipe 34 is held in place by the resilience of the fastening bands 40. In this connection, the bridging portions 38a of the mounting rings 38 and the fastening bands 40 enable the intake pipe 34 to be supported on the intake manifold 10 in a so-called floating manner, that is, in such a manner that the intake pipe 34 is movable to some extent relative to the intake manifold 10.

The mounting rings 38 and fastening bands 40 are made of rubber or the like resilient material, and the hooks 42 are preferably formed integral with the intake manifold 10 in such a manner that the paired ones are located on the horizontally opposed portions of the intake manifold 10 for the convenience of hooking the corresponding ends of the fastneing bands 40.

In the foregoing arrangement, the intake pipe 34 is urged against the intake manifold 10 by a force exerted by the resilient fastening bands 40, causing the bridge portions 38a of the resilient mounting rings 38 to flex a little inward of the intake pipe 34 and resultantly exert a force urging the intake pipe 34 to move away from the intake manifold 10. By the balance of the above two forces, the intake pipe 34 is installed in the foregoing floating manner.

From the foregoing, it is to be understood that by the effect of the resilience of the mounting rings 38 and the fastening bands 40, the intake pipe arrangement 32 of the present invention can compensate the production tolerances at the junction between the downstream end of the intake pipe 34 and the turbocharger 14.

It is further to be understood that the intake pipe arrangement of this invention can eliminate the need of the rubber duct 22, thus making it possible to reduce the number of constituent parts of the intake system for thereby reducing the manufacturing and assembly expense.

It is still further to be understood that the intake pipe arrangement of the present invention can absorb the difference in the amount of thermal expansion between the intake pipe 34 and the intake manifold 10 without requiring an additional rubber duct, thus making it possible to improve the durability of the intake system with a minimum manufacturing and assembling expense.

In the foregoing embodiment, the rubber duct 24 is provided to interconnect the intake pipe 34 and the air cleaner 18 for allowing both to be movable to a certain large extent relative to each other since the air cleaner 18 is rigidly mounted on the vehicle body 26. In this connection, it is to be understood that, in the case where the air cleaner is of the kind which is to be mounted on the engine proper 12, the intake pipe arrangement 32 of the present invention can also eliminate the need of such a rubber duct 24.

Figure 4:
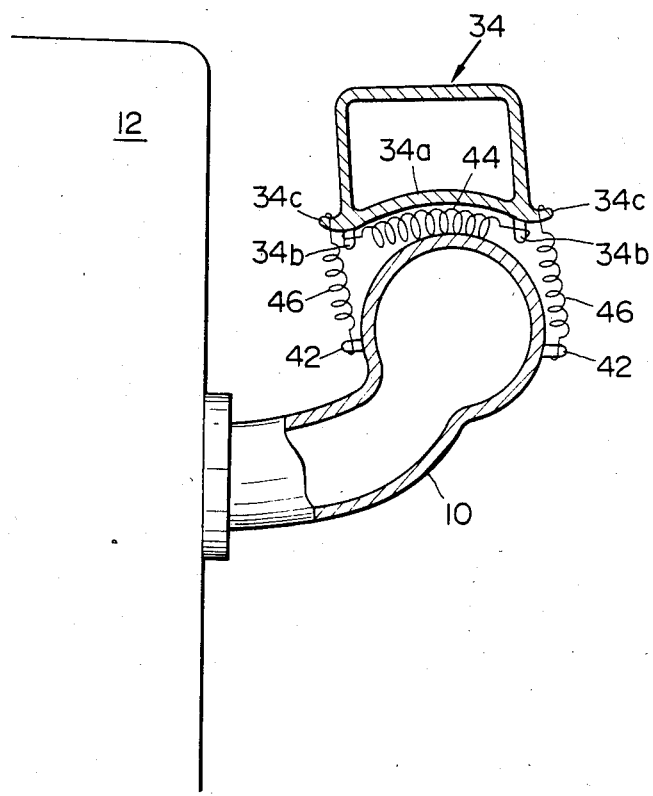
FIG. 4 is a view similar to FIG. 3 but showing a modified embodiment according to the present invention.

FIG. 4 shows a modified embodiment of the present invention.

In this embodiment, the foregoing mounting ring 38 is replaced by a first coil spring 44 and the fastening band 40 by a pair of second coil springs 46. The first coil spring 44 is arranged to span the concave side 34a of the intake pipe 34 and hooked at the opposed ends and in a predetermined tensioned state to corresponding hooks 34b in the form of projections provided to the intake pipe 34. Each of the second coil springs 46 is arranged in a predetermined tensioned state and hooked at the opposed ends to the hook 42 of the intake manifold 10 and to a corresponding hook 34c in the form of a projection provided to the intake pipe 34.

This embodiment is adapted for usage under a high temperature and can produce substantially the same effect as the previous embodiment.

What is claimed is:

1. An engine intake pipe arrangement for an automotive vehicle comprising:
    an intake pipe;
    a support; and
    means for supporting and holding said intake pipe in a floating and spaced relationship on said support, said means including a springy resilient mounting member interposed in a resilient state between said intake pipe and said support enabling the intake pipe to be movable away from and toward said support, and a springy resilient fastening member connected in a stretched state between said intake pipe and support and urging said intake pipe toward said support against the resilience of said mounting member.

2. An engine intake pipe arrangement as set forth in claim 1 in which said intake pipe is rigid but has some flexibility.

3. An engine intake pipe arrangement as set forth in claim 2 further comprising an air cleaner which is rigidly mounted on a vehicle body and to which an upstream end of said intake pipe is connected.

4. An engine intake pipe arrangement as set forth in claim 3 in which the upstream end of said intake pipe is connected through a rubber duct to said air cleaner.

5. An engine intake pipe arrangement as set forth in claim 3 in which said support comprise an intake manifold to which a downstream end of said intake pipe is connected.

6. An engine intake pipe arrangement as set forth in claim 5 in which said intake pipe is at least in part formed to have a rectangle-like cross section having three straight sides and one concave side.

7. An engine intake pipe arrangement comprising an intake pipe, said intake pipe being rigid but having some flexibility and having a rectangle-like cross section with three straight sides and one concave side, a support comprising an intake manifold connected to a downstream end of said intake pipe, and means for mounting and holding said intake pipe on said support including a resilient mounting member interposed between said intake pipe and said support for mounting said intake pipe in a floating manner on said support enabling the intake pipe to be movable relative to said support, and a resilient fastening member fastening said intake pipe to said support, said mounting member including a resilient mounting ring mounted on said intake pipe in a predetermined stretched state, said mounting ring having a bridge portion spanning said concave side of said intake pipe, said intake pipe being placed on said intake manifold in such a manner that said bridge portion of said mounting ring is in contact with an upper part of said intake manifold.

8. An engine intake pipe arrangement as set forth in claim 7 in which said mounting and holding means further have a pair of hooks in the form of projections provided to said intake manifold, and in which said fastening member comprises a resilient fastening band which is arranged adjacent said mounting ring in a manner to partly encircle said intake pipe and is hooked at the opposed ends thereof and in a predetermined stretched state of said hooks.

9. An engine intake pipe arrangement as set forth in claim 8 in which said mounting ring and said fastening band are made of rubber.

10. An engine intake pipe arrangement comprising an intake pipe, said intake pipe being rigid but having some flexibility and having a rectangle-like cross section with three straight sides and one concave side, a support comprising an intake manifold connected to a downstream end of said intake pipe, and means for mounting and holding said intake pipe on said support including a resilient mounting member interposed between said intake pipe and said support for mounting said intake pipe in a floating manner on said support enabling the intake pipe to be movable relative to said support, and a resilient fastening member fastening said intake pipe to said support, said mounting member including a coil spring mounted on said intake pipe to span said concave side thereof and in a predetermined stretched state, said intake pipe being placed on said intake manifold in such a manner that said coil spring is in contact with an upper part of said intake manifold.

11. An engine intake pipe arrangement as set forth in claim 10 in which said mounting and holding means further have a pair of hooks in the form of projections provided to said intake manifold and a pair of hooks in the form of projections provided to said intake pipe, and in which said fastening member comprises a pair of coil springs which are hooked at the opposed ends thereof and in a predetermined stretched state to said intake pipe hook and said intake manifold hook, respectively.

* * * * *